US012682789B2

(12) United States Patent (10) Patent No.: US 12,682,789 B2
Tu et al. (45) Date of Patent: Jul. 14, 2026

(54) DEVICE FOR SIMULATING SUCTION PENETRATION OF SUCTION CAISSON BASED ON CENTRIFUGE MODEL TEST

(71) Applicant: East China Jiaotong University, Nanchang (CN)

(72) Inventors: Wenbo Tu, Nanchang (CN); Changjie Xu, Nanchang (CN); Xiaoqiang Gu, Shanghai (CN); Xinglei Cheng, Tianjin (CN); Sen Li, Shanghai (CN); Hao Zhang, Shanghai (CN); Mingxin Zheng, Nanchang (CN); Pengfei Zhang, Nanchang (CN); Weicheng Hu, Nanchang (CN)

(73) Assignee: East China Jiaotong University, Nanchang (CN)

( * ) Notice: Subject to any disclaimer, the term of this patent is extended or adjusted under 35 U.S.C. 154(b) by 399 days.

(21) Appl. No.: 18/515,792

(22) Filed: Nov. 21, 2023

(65) Prior Publication Data

US 2024/0296757 A1 Sep. 5, 2024

(30) Foreign Application Priority Data

Mar. 1, 2023 (CN) .......................... 202310186175.5

(51) Int. Cl.
G09B 25/02 (2006.01)
(52) U.S. Cl.
CPC .................................... G09B 25/02 (2013.01)

(58) Field of Classification Search
CPC ...... G09B 25/02; G01M 99/007; G01D 21/02
See application file for complete search history.

(56) References Cited

U.S. PATENT DOCUMENTS

| | | | | |
|---|---|---|---|---|
| 2019/0331572 A1* | 10/2019 | Wang | ........................ | G01N 3/24 |
| 2020/0399851 A1* | 12/2020 | Olsen | ........................ | E02D 5/24 |
| 2021/0364401 A1* | 11/2021 | Guo | ........................ | G01N 3/06 |
| 2022/0252473 A1* | 8/2022 | Michiwaki | ................ | G01L 1/22 |
| 2023/0113664 A1* | 4/2023 | Carlsen | ................... | B63B 27/08 |
| | | | | 114/296 |
| 2023/0332369 A1* | 10/2023 | Mathis | .................... | B63B 21/27 |

* cited by examiner

*Primary Examiner* — Ricky Go

(57) ABSTRACT

A device for simulating suction penetration of suction caisson based on centrifuge model test includes a model box, a suction caisson model in the model box and containing a suction caisson and a connecting rod, a penetration device disposed above the model box and movably connected to the connecting rod, a vacuum system connected to the suction caisson, a lower part of the suction caisson is provided with soil, and an upper part of the soil is provided with a water body. The penetration device includes a guide rail and a drive lever. The drive lever penetrates through the model box and then is connected to an electromagnetic adsorption device, a bottom end of which includes a guide housing, and the connecting rod is inserted into the guide housing. The device can dynamically correct displacement deviation in a suction penetration process, thereby being continuously tested in a centrifugal state.

10 Claims, 3 Drawing Sheets

DEVICE FOR SIMULATING SUCTION PENETRATION OF SUCTION CAISSON BASED ON CENTRIFUGE MODEL TEST

TECHNICAL FIELD

The disclosure relates to the field of offshore wind power foundations, particularly to a device for simulating suction penetration of suction caisson based on centrifuge model test.

BACKGROUND

As one of the clean renewable energy sources, wind energy is widely distributed and has great potential for development, among which wind power generation is an important utilization of wind energy. In recent years, China has rapidly accelerated the construction of offshore wind power plants, and it is expected that an additional offshore wind power grid capacity of 8 to 10 million kilowatts (KW) will be added in 2021 to 2025. The construction of offshore wind power plants involves huge costs, and cost control has been a major difficulty in the development of the offshore wind power industry, of which a wind turbine foundation cost accounts for about 20%-30% of a total construction cost of a project. Compared with a common large-diameter monopile foundation, a suction caisson is a reliable choice that can effectively reduce engineering costs and adapt to soft clay and sandy soil sites simultaneously. However, different from the large-diameter monopile foundation, suction penetration of the suction caisson easily leads to excessive uplift of a mud surface in the foundation, thereby forming a "soil plug phenomenon". Moreover, the suction force exerted on non-cohesive soil further causes seepage inside and outside the suction caisson, which aggravates the soil plug. A large number of studies show that in the installation process of dead weight and suction penetration, about 30%-50% of soil is replaced by the side wall of the suction caisson, and the soil squeezing and the suction force generated during the installation process can lead to irreversible plastic deformation of the soil, as well as variations of pore water pressure and effective stress of the soil, which certainly affect the mechanical characteristics of the suction caisson. However, the above-mentioned results are mostly obtained from 1 g (referred to gravitational acceleration being 1 g) laboratory model test, and the stress generated by the dead weight is small, which may be different from the soil plug phenomenon and the soil stress change law under practical working conditions. Therefore, the soil plug phenomenon and the soil stress change law that are closer to the practical working conditions can be obtained by a centrifuge model test. However, it is not possible to effectively implement the suction penetration of the suction caisson in the traditional centrifuge model test. A difficulty of the suction penetration is that the suction caisson is placed on the surface of the soil and controls the penetration in a vertical perpendicularity without stopping the vacuum pump. Therefore, it is of great significance to the engineering practice to effectively implement the suction penetration in the centrifuge model test, to monitor and record changes in characteristics of the suction caisson and the soil in the penetration process, and then to analyze the penetration effect on static and dynamic characteristics of the suction caisson in the engineering practice.

Chinese Patent Application (Publication No. CN114894510A) discloses a centrifugal model test for the installation and operation process of a suction caisson.

However, when the centrifugal model test is conducted, the following problems occurred.

1. The centrifugal model test has a counterweight structure, which has poor stability and availability during continuous centrifuge rotation, thereby affecting test results.

2. The centrifugal model test can only ensure the perpendicularity of the suction caisson in a non-centrifugal state, and the perpendicularity cannot be guaranteed in a centrifugal state. Therefore, a test cannot be performed under an action of a greater centrifugal force with the centrifugal model test.

3. With the centrifugal model test, the displacement of the suction caisson and the deformation of the soil inside and outside the suction caisson cannot be directly observed, and the operation of implementing the centrifugal model test is complicated.

SUMMARY

In order to solve the problems mentioned above, the disclosure provides a device for simulating suction penetration of suction caisson based on centrifuge model test.

According to a technical solution, the disclosure provides the device for simulating suction penetration of suction caisson based on centrifuge model test, including a model box, a suction caisson model disposed in the model box and including a suction caisson, a vacuum system connected to the suction caisson, and a penetration device disposed on a top end of the model box; and a lower part of the suction caisson is provided with soil, and an upper part of the soil is provided with a water body; and the suction caisson is composed of a side wall in a semicircle shape, a head plate in a semicircle shape disposed on a top end of the side wall, and a connecting rod disposed on a top end of the head plate and connected to the penetration device; the head plate and the side wall together form a semicircular caisson-shaped structure, a side and a bottom of the semicircular caisson-shaped structure are open to form openings at the side and the bottom of the semicircular caisson-shaped structure, and an upper edge and side edges of the semicircular caisson-shaped structure at the opening at the side of the semicircular caisson-shaped structure are provided with sealing structures; an inner portion of the model box is divided into a first area and a second area by a tempered glass, and the suction caisson model and the penetration device are disposed in the first area; and an opening side of the suction caisson is in contact with a side face of the tempered glass to define a contact portion, and the contact portion is sealed through the sealing structures.

In an embodiment, the penetration device includes a support disposed on the top end of the model box, a guide rail disposed on the support, and a drive lever disposed in the guide rail; the drive lever is configured to penetrate through the top end of the model box and connect to an electromagnetic adsorption device disposed in the model box, a bottom end of the electromagnetic adsorption device is connected to a guide housing, and a top end of the connecting rod is disposed in the guide housing; and the guide rail is connected to a transversal drive device, the transversal drive device is configured to drive the guide rail to move transversely, and a top end of the drive lever is connected to a vertical drive device.

In an embodiment, a portion of the top end of the model box penetrated by the drive lever is provided with a sliding slot in an elongated strip shape, and the guide rail is configured to extend into the sliding slot and is capable of moving in the sliding slot.

In an embodiment, the transversal drive device includes a transversal gear rack and a gear, the transversal gear rack is connected to the guide rail, the gear is connected to the support and is engaged with the transversal gear rack, and the gear is configured to connect to a driving component.

In an embodiment, the top end of the connecting rod is provided with a mass block; and the mass block is disposed in the guide housing, and a position of the mass block is limited by an inner wall of the guide housing, and the mass block is capable of moving up and down along the inner wall of the guide housing.

In an embodiment, the soil is provided with multiple sensors therein, and the multiple sensors are distributed in the soil that is located inside and outside the side wall of the suction caisson when the suction caisson completely penetrates the soil.

In an embodiment, the soil is internally provided with at least three layers of tracer soil zones, the at least three layers of tracer soil zones are uniformly distributed in the soil, and have colors different from a color of the soil, the at least three layers of tracer soil zones are disposed in an embedded depth range twice of a height of the suction caisson separated from a surface of the soil, and the at least three layers of tracer soil zones are configured to display deformation conditions of the soil.

In an embodiment, the model box is provided with multiple laser displacement meters therein, and the multiple laser displacement meters are configured to monitor displacement conditions of the suction caisson in each direction.

In an embodiment, the vacuum system includes a conduit, a water gas conversion device, and a vacuum pump; and an end of the conduit is connected to the suction caisson, the water gas conversion device is connected to another end of the conduit, and the vacuum pump is connected to the water gas conversion device.

In an embodiment, a camera is disposed in the second area.

Beneficial effects: the device for simulating suction penetration of suction caisson based on centrifuge model test according to the disclosure has the following beneficial effects.

1. The disclosure does not set a counterweight structure, has high stability and availability in the continuous rotation of the centrifuge, thereby guaranteeing that the test results of the centrifuge model test are accurate.

2. The disclosure sets the transparent tempered glass and the camera, guaranteeing that the test state can be observed in real-time in the centrifugal state.

3. The disclosure sets the penetration device, which can dynamically correct displacement deviation in a penetration process of the suction caisson, thereby realizing that the device of the disclosure can be tested continuously in the centrifugal state.

4. The disclosure provides an earth pressure cell and a pore pressure gauge to record characteristics and displacement variations of the soil around the suction caisson, so that the penetration simulation and the penetration effect analysis of the suction caisson are realized, and thereby providing a theoretical basis for subsequent analysis of static and dynamic working characteristics of the suction caisson.

DETAILED DESCRIPTION OF EMBODIMENTS

The disclosure is further described below with reference to embodiments and attached drawings.

Figure 1:
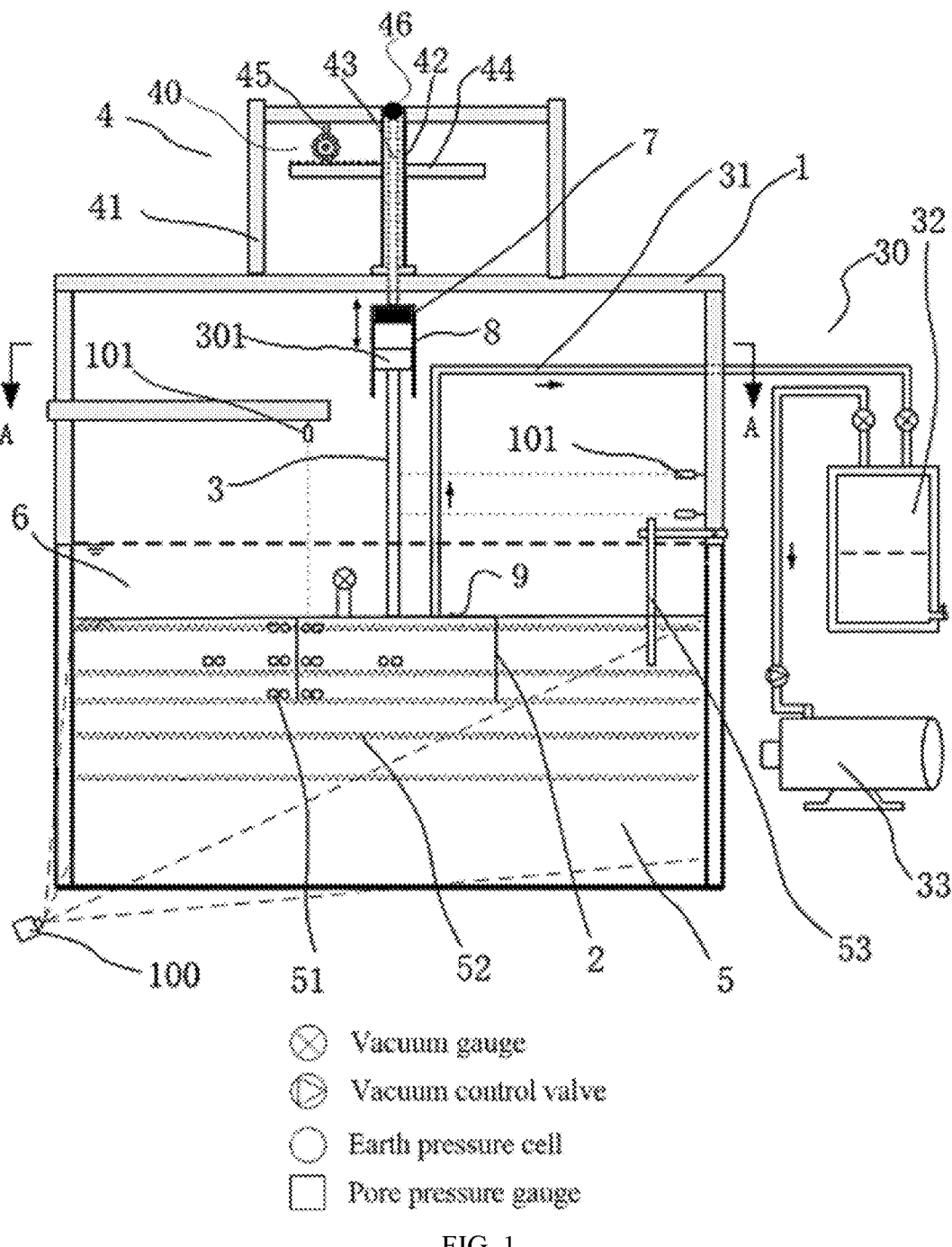
FIG. 1 illustrates a schematic structural diagram of a device for simulating suction penetration of suction caisson based on centrifuge model test according to the disclosure.
Figure 2:
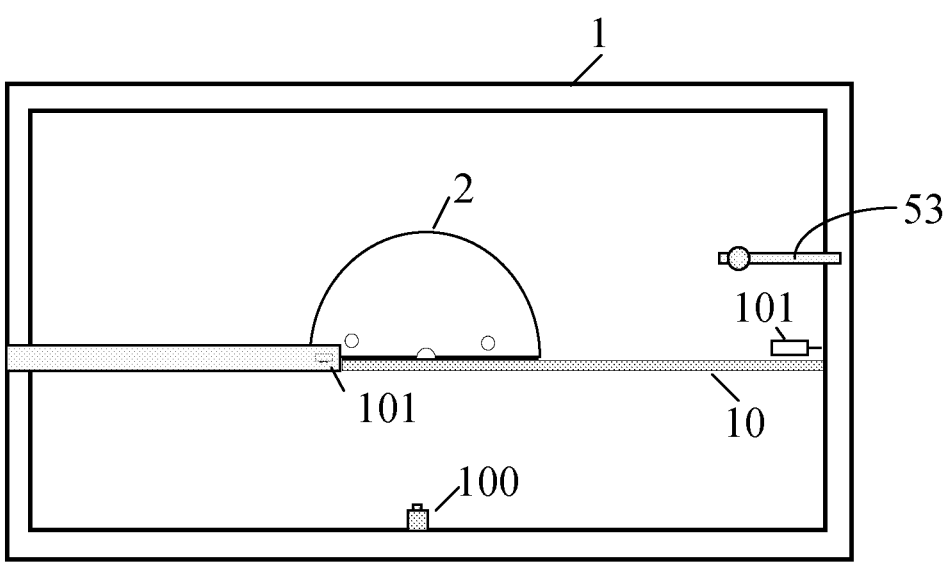
FIG. 2 illustrates a sectional view of the device of FIG. 1 along an A-A direction.
Figure 5:
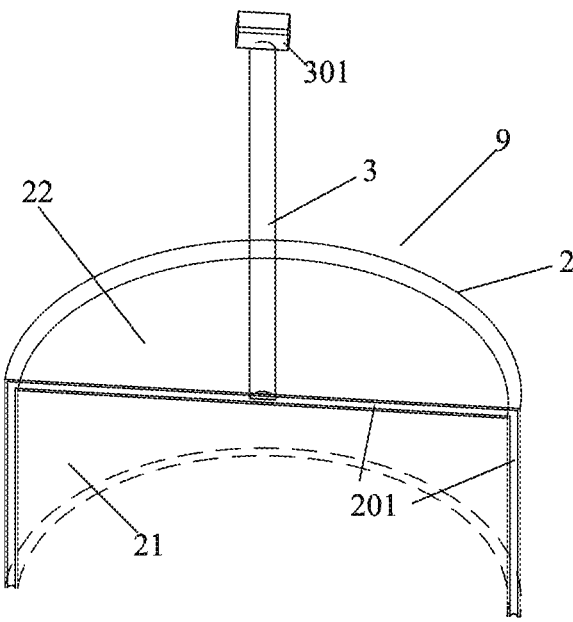
FIG. 5 illustrates a schematic structural diagram of a suction caisson model according to the disclosure.

As shown in FIG. 1, FIG. 2, and FIG. 5, a device for simulating suction penetration of suction caisson based on centrifuge model test of the disclosure includes a model box 1, a suction caisson model 9 disposed in the model box 1 and including a suction caisson 2 and a connecting rod 3, and a penetration device 4 disposed on a top end of the model box 1 and movably connected to a top end of the connecting rod 3; the disclosure further includes a vacuum system 30 connected to the suction caisson 2, soil 5 is disposed below the suction caisson 2, and a top portion of the soil 5 is provided with a water body 6 thereon. The soil 5 is provided with multiple sensors 51 therein and the multiple sensors 51 are distributed in the soil 5 that is located inside and outside a side wall 21 of the suction caisson 2 when the suction caisson 2 completely penetrates the soil 5. In addition, the soil 5 is internally provided with at least three layers of tracer soil zones 52, the at least three layers of tracer soil zones are uniformly distributed in the soil 5 and have colors different from a color of the soil 5, and the at least three layers of tracer soil zones 52 are used to display the deformation of the soil 5. Moreover, the model box 1 is provided with multiple laser displacement meters 101 therein and the multiple laser displacement meters 101 are used to monitor displacement of the suction caisson 2 in each direction. The soil 5 is further internally provided with a T-bar penetrometer 53, and each of the multiple sensors 51 can be an earth pressure cell, or a pore pressure gauge, or a combination of the earth pressure cell and the pore pressure gauge.

The suction caisson 2 is composed of a side wall 21 in a semicircle shape, a head plate 22 in a semicircle shape disposed on a top end of the side wall 21, and the connecting rod 3 disposed above the head plate 22 and connected to the penetration device 4; the head plate 22 and the side wall 21 together form a semicircular caisson-shaped structure, a side and a bottom of the semicircular caisson-shaped structure are open to form openings at the side and the bottom of the semicircular caisson-shaped structure, and an upper edge and side edges of the semicircular caisson-shaped structure at the opening at the side of the semicircular caisson-shaped structure are provided with sealing structures 201, and the sealing structure 201 can be rubber sealing strips; an inner portion of the model box 1 is divided into a first area and a second area by a tempered glass 10, and the suction caisson model 9 and the penetration device 4 are disposed in the first area; and an opening side of the suction caisson 2 is in contact with a side face of the tempered glass 10 to define a contact portion, and the contact portion is sealed through the sealing structures 201. The sealing structure 201 can prevent water in the model box 1 from entering the suction caisson 2 through a gap between the suction caisson 2 and the tempered glass 10 during the suction penetration test. A camera 100 is disposed in the second area and the camera 100 can facilitate real-time observation of the suction penetration of the suction caisson 2. Specially, it should be noted that the camera 100 shown in FIG. 1 is not used to illustrate its corresponding position, and is only used to illustrate its function to observe the deformation of the soil 5.

The vacuum system 30 includes a conduit 31, an end of which is connected to the suction caisson 2, a water gas conversion device 32 connected to another end of the conduit 31, and a vacuum pump 33 connected to the water gas conversion device 32. Alternatively, the vacuum system 30 can select other existing devices or systems capable of achieving the same functions as the disclosure. The vacuum pump 33 is used for extracting vacuum for the suction caisson 2 to form negative pressure, and the vacuum system 30 further includes a vacuum control valve, a vacuum gauge, and other common vacuum system devices. Specially, the vacuum control valve is used to adjust the magnitude of a suction force, the vacuum gauge monitors the actual negative pressure, and the water gas conversion device 32 is used to convert the negative pressure generated by the vacuum pump 33 into penetration negative pressure of the suction caisson 2. Meanwhile, the water gas conversion device 32 is used to receive the water body 6 extracted by the vacuum and is also used for pressure relief after the suction penetration test is finished.

Figure 3:
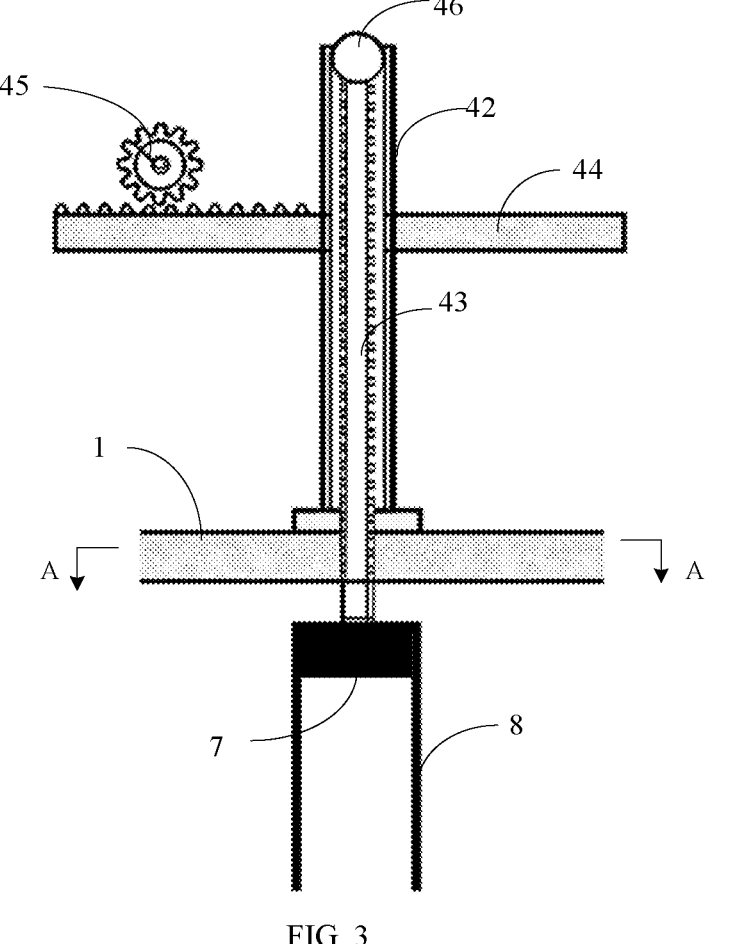
FIG. 3 illustrates a schematic diagram of a partial structure of a penetration device according to the disclosure.

As shown in FIG. 3, the penetration device 4 includes a support 41 disposed on the top end of the model box 1, a guide rail 42 disposed on the support 41, and a drive lever 43 disposed in the guide rail 42; the drive lever 43 is used to penetrate through the top end of the model box 1 and connect to an electromagnetic adsorption device 7 disposed in the model box 1, a bottom end of the electromagnetic adsorption device 7 is connected to a guide housing 8, and a top end of the connecting rod 3 is disposed in the guide housing 8; and the guide rail 42 is connected to a transversal drive device 40, the transversal drive device 40 is used to drive the guide rail 42 to move transversely, and a top end of the drive lever 43 is connected to a vertical drive device 46. Specially, the transversal drive device 40 includes a gear rack 44 and a gear 45, the gear rack 44 is connected to the guide rail 42, and the gear 45 is connected to the support 41 and is engaged with the transversal gear rack 44. Furthermore, the gear 45 is used to connect to a driving device and the driving device can be a motor. The vertical drive device 46 connected to the top end of the drive lever 43 usually can be a hydraulic drive device, or other existing devices or structures capable of pushing and pulling the drive lever 43. In addition, the top end of the connecting rod 3 is provided with a mass block 301; and the mass block 301 is disposed in the guide housing 8, and the position of the mass block 301 is limited by the inner wall of the guide housing 8, and the mass block 301 is capable of moving up and down along the inner wall of the guide housing 8.

Figure 4:
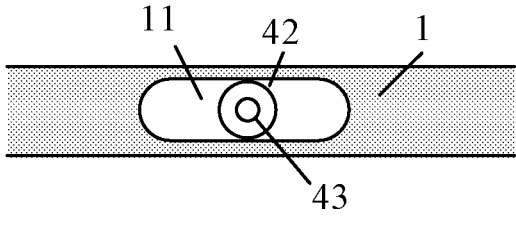
FIG. 4 illustrates a sectional view of the partial structure of FIG. 3 along an A-A direction.

As shown in FIG. 4, a portion of the top end of the model box 1 penetrated by the drive lever 43 is provided with a sliding slot 11 in an elongated strip shape, and the guide rail 42 is used to extend into the sliding slot 11 and is capable of moving in the sliding slot 11.

When the device of the disclosure is used to perform a simulation test, it needs to be placed on a centrifuge, and then, the centrifuge starts running to achieve a target centrifugal acceleration designated by the simulation test (such as 50×gravity acceleration abbreviated as G), and then the T-bar penetrometer 53 is used to carry out a penetration test to measure penetration resistance of soft clay (i.e., the soil 5) to estimate magnitude of a suction penetration force. The penetration device 4 is controlled by the support 41 to release the suction caisson model 9 adsorbed on the electromagnetic adsorption device 7 along the drive lever 43, and after the bottom end of the suction caisson 2 is placed on the surface of the soil 5, the electromagnetic adsorption device 7 is disconnected with the suction caisson model 9, so that the suction caisson model 9 first penetrates under a dead weight, and then the vacuum system 30 is turned on to perform negative pressure penetration simulation. In order to ensure perpendicularity of the suction caisson model 9 under the dead weight and during a suction penetration process, the multiple laser displacement meters 101 are used to monitor variations of displacement and rotation angle of the suction caisson 2 during the negative pressure suction penetration. It is noted that relatively small rotation angles and horizontal displacements can be limited by a side wall of the rectangular guide housing 8 of the penetration device 4; and when data recorded by the multiple laser displacement meters 101 indicates that there is a large displacement deviation of the suction caisson 2, the suction caisson model 9 can be corrected by the penetration device 4 through adjusting the transversal drive device 40 and the vertical drive device 46.

In the suction penetration process, the camera 100, which is subminiature and high resolution, is configured to obtain real-time images of continuously varied displacements of the soil 5 and the suction caisson 2. Moreover, images of moving particles in the soil 5 can be obtained by using particle image velocimetry (PIV technology), and then the obtained images are divided into image pixels for analysis to determine a displacement variation trend of the soil 5 inside and outside the suction caisson 2 during the suction penetration process. Further, in order to facilitate observing the deformation conditions of the soil 5 around the suction caisson model 9, the soil 5 is subjected to carbon powder dyeing treatment to form a dark zone. Meanwhile, the set multiple earth pressure cells, the multiple pore pressure gauges, and the laser displacement meters 101 are respectively used to monitor and record variations of earth pressure along horizontal and depth directions, variations of pore water pressure along horizontal and depth directions, and a penetration speed, vertical displacement, and horizontal displacement of the suction caisson.

What is claimed is:

1. A device for simulating suction penetration of suction caisson based on centrifuge model test, comprising: a model box, a suction caisson model disposed in the model box and comprising a suction caisson, a vacuum system connected to the suction caisson, and a penetration device disposed on a top end of the model box;

wherein soil is disposed below the suction caisson, and a top portion of the soil is provided with a water body thereon; and wherein the suction caisson is composed of a side wall in a semicircle shape, a head plate in a semicircle shape disposed on a top end of the side wall, and a connecting rod disposed on a top end of the head plate and connected to the penetration device; the head plate and the side wall together form a semicircular caisson-shaped structure, a side and a bottom of the semicircular caisson-shaped structure are open to form openings at the side and the bottom of the semicircular caisson-shaped structure, and an upper edge and side edges of the semicircular caisson-shaped structure at the opening at the side of the semicircular caisson-shaped structure are provided with sealing structures; an inner portion of the model box is divided into a first area and a second area by a tempered glass, and the suction caisson model and the penetration device are disposed in the first area; and an opening side of the suction caisson is in contact with a side face of the tempered glass to define a contact portion, and the contact portion is sealed through the sealing structures.

2. The device for simulating suction penetration of suction caisson based on centrifuge model test as claimed in claim 1, wherein the penetration device comprises a support disposed on the top end of the model box, a guide rail disposed on the support, and a drive lever disposed in the guide rail;

wherein the drive lever is configured to penetrate through the top end of the model box and connect to an electromagnetic adsorption device disposed in the model box, a bottom end of the electromagnetic adsorption device is connected to a guide housing, and a top end of the connecting rod is disposed in the guide housing; and wherein the guide rail is connected to a transversal drive device, the transversal drive device is configured to drive the guide rail to move transversely, and a top end of the drive lever is connected to a vertical drive device.

3. The device for simulating suction penetration of suction caisson based on centrifuge model test as claimed in claim 2, wherein a portion of the top end of the model box penetrated by the drive lever is provided with a sliding slot in an elongated strip shape, and the guide rail is configured to extend into the sliding slot and is capable of moving in the sliding slot.

4. The device for simulating suction penetration of suction caisson based on centrifuge model test as claimed in claim 2, wherein the transversal drive device comprises a transversal gear rack and a gear, the transversal gear rack is connected to the guide rail, the gear is connected to the support and is engaged with the transversal gear rack, and the gear is configured to connect to a driving component.

5. The device for simulating suction penetration of suction caisson based on centrifuge model test as claimed in claim 4, wherein a camera is disposed in the second area.

6. The device for simulating suction penetration of suction caisson based on centrifuge model test as claimed in claim

2, wherein the top end of the connecting rod is provided with a mass block; and the mass block is disposed in the guide housing, and a position of the mass block is limited by an inner wall of the guide housing, and the mass block is capable of moving up and down along the inner wall of the guide housing.

7. The device for simulating suction penetration of suction caisson based on centrifuge model test as claimed in claim 1, wherein the soil is provided with a plurality of sensors therein, and the plurality of sensors are distributed in the soil that is located inside and outside the side wall of the suction caisson when the suction caisson completely penetrates the soil.

8. The device for simulating suction penetration of suction caisson based on centrifuge model test as claimed in claim 1, wherein the soil is internally provided with at least three layers of tracer soil zones, the at least three layers of tracer soil zones are uniformly distributed in the soil, and have colors different from a color of the soil, the at least three layers of tracer soil zones are disposed in an embedded depth range twice of a height of the suction caisson separated from a surface of the soil, and the at least three layers of tracer soil zones are configured to display deformation conditions of the soil.

9. The device for simulating suction penetration of suction caisson based on centrifuge model test as claimed in claim 1, wherein the model box is provided with a plurality of laser displacement meters therein, and the plurality of laser displacement meters are configured to monitor displacement conditions of the suction caisson in each direction.

10. The device for simulating suction penetration of suction caisson based on centrifuge model test as claimed in claim 1, wherein the vacuum system comprises a conduit, a water gas conversion device, and a vacuum pump; and an end of the conduit is connected to the suction caisson, the water gas conversion device is connected to another end of the conduit, and the vacuum pump is connected to the water gas conversion device.

* * * * *